Figure 1:
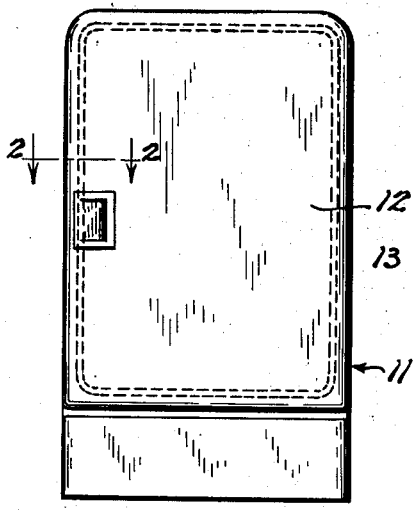

Nov. 17, 1953     A. W. KORB     2,659,116

MAGNETIC DOOR SEAL

Filed July 17, 1951

INVENTOR.
Anton W. Korb.
BY
Thiess, Olsen & Mecklenburger.
Attys.

Patented Nov. 17, 1953

2,659,116

UNITED STATES PATENT OFFICE 2,659,116

MAGNETIC DOOR SEAL

Anton W. Korb, Grandville, Mich., assignor to Jervis Corporation, a corporation of Michigan Application July 17, 1951, Serial No. 237,259

5 Claims. (Cl. 20—69)

1

This invention relates to a magnetic door seal and more particularly to a magnetic door seal employing a minimum number of magnets while obtaining a substantially continuous line of sealing over any desired length. It is an object of the invention to provide improved apparatus of such character.

The present invention is an improvement in the magnetic door sealing apparatus and portions thereof disclosed and claimed in Patents Nos. 2,446,336, 2,471,634 and 2,471,635 by Vennice E. Mark and Lloyd L. Anderson and applications Nos. 295,608, a continuation of application Serial No. 150,748, now abandoned, 151,462 and 152,244, all entitled Magnetic Door Seal, filed March 20, 1950, March 23, 1950, and March 27, 1950, respectively, and all assigned to the same assignee as the present application.

In accordance with one embodiment of the invention a gasket is secured to a door, for example a refrigerator door, and has a longitudinally extending portion which is quite freely movable toward and away from the door. The last-mentioned portion is abuttable against a portion of the refrigerator casing, for example, along a line extending around an opening which the door serves to close. Within the gasket and adjacent the portion thereof which is abuttable against the casing, there are arranged a plurality of permanent magnets spaced longitudinally with respect to the gasket. Between adjacent magnets there is arranged in each instance a nonmagnetized but magnetically attractable element, such as a soft iron slug, which preferably contacts the ends of the two adjacent magnets. finally, each magnet is arranged with its poles spaced longitudinally with respect to the gasket and the magnets are so oriented that the opposed ends of each of the interposed soft iron slugs face like poles of the two adjoining or abutting magnets.

With such an arrangement the number of magnets required for a given length of gasket is approximately one-half the number required if magnets are employed in continuous end-to-end relationship. At the same time magnetic attraction of substantial force is obtained between the elements within the gasket and the portion of the casing adjoining the gasket over the entire length of the gasket.

Accordingly it is another object of the invention to provide an improved magnetic door seal requiring a substantially smaller number of permanent magnets than is suggested by the prior art while obtaining a tight seal over the entire desired length.

It is another object of the invention to provide an improved magnetic door seal employing a gasket having magnets arranged therein, said magnetic door seal employing a substantially smaller number of permanent magnets than is suggested by the prior art while obtaining a tight seal between said gasket and a cooperating structural member over the entire length of said gasket.

The invention, together with further objects and advantages thereof, will best be understood by reference to the following description taken in connection with the accompanying drawing, and its scope will be pointed out in the appended claims.

Figure 2:
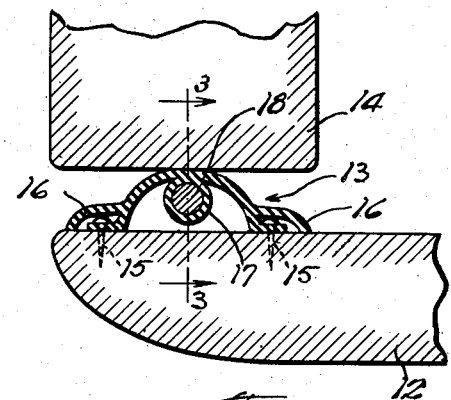
Figure 3:
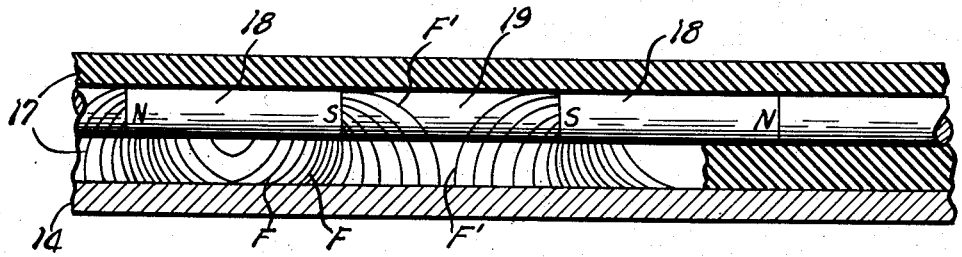

In the drawing, in which like parts are designated by like reference numerals,

Fig. 1 is an elevational view of a refrigerator, illustrating one application of the present invention;

Fig. 2 is an enlarged cross-sectional view taken along the line 2—2 of Fig. 1 and illustrating one embodiment of the invention; and Fig. 3 is an enlarged cross-sectional view taken along the line 3—3 of Fig. 2, further illustrating the apparatus of Figs. 1 and 2 and depicting certain magnetic characteristics thereof.

The invention has been found to be well adapted to the sealing of refrigerator doors and accordingly is illustrated in an embodiment applied to such use. It is to be understood, however, that the invention is not limited to such an application.

In Fig. 1 there is shown a refrigerator 11 having a door 12 and a gasket 13 secured thereto. As may be seen best in Fig. 2, a portion of the gasket 13, when the door is closed, abuts a portion of the refrigerator casing 14 to effect a seal between the door and the casing of the refrigerator.

The gasket 13 is preferably constructed of soft resilient material such as rubber or soft plastic and is secured to the door 12 by screws 15 or other fasteners. The gasket may thus be secured to the door along both edges of the gasket, as shown, or along one edge only, as suggested in application Serial No. 295,608, referred to above. In either case, it is desirable, for reasons which will subsequently become apparent, that a longitudinally extending portion of the gasket be arranged to move resiliently toward and away from the door. In the illustrated embodiment of the invention, it is the center portion of the gasket which is so arranged. In this embodiment it will be noted that the gasket has flaps 16 which extend out over and conceal the heads of the fasteners 15.

The center portion of the gasket has incorporated therein a hollow cylindrical tube 17 which is adapted to receive cylindrical magnets 18 and alternate soft iron slugs 19 which may be seen best in Fig. 3. The casing 14 is constructed of magnetically attractable material such as the sheet steel normally employed in the construction of a refrigerator. When the door is in its closed position as indicated in the drawing the magnets 18 and, as will subsequently be explained, the soft iron slugs 19, are attracted toward the casing 14 and force the center portion of the gasket firmly in sealing contact therewith. In the embodiment illustrated, the casing 14 acts as magnetically attractable means for cooperating with the magnets and soft iron slugs in the gasket and for providing a surface against which the gasket may be pressed to effect a seal. Two functions are therefore performed by this means. It is not essential that the magnetically attractable portion of this means actually contact the gasket, and in the illustrated embodiment of the invention it will be noted that the portion of this means which actually contacts the gasket is the conventional porcelain coating which is, of course, nonmagnetic.

The soft or resilient nature of the gasket and its form of construction permit the center portion thereof to move readily toward and away from the door 12 whereby the gasket may be brought into engagement with the casing 14 by the magnets 18 and the soft iron slugs 19 even though there are substantial irregularities in the facing portions of the door 12 and the casing 14. These irregularities may arise for various reasons and may be in the form of undulations in either or both of the facing surfaces or in the form of an overall warping or general nonparallelism of one surface with respect to the other. It will be noted that the longitudinal edges of the flaps 16 are not secured to the door 12. This arrangement is intended primarily to permit access to the fasteners 15 but serves another important function in that it permits greater movement of the center portion of the gasket toward and away from the door 12 than would otherwise be possible.

The effect of the soft iron slugs 19, interposed between adjacent magnets 18, will now be explained in connection with Fig. 3. In that figure the magnets 18 and the soft iron slugs 19 may be seen enclosed within the cylindrical portion 17 of the gasket, the latter being pressed against the surface of the casing 14. Illustrative flux lines F are shown in order to facilitate explanation of the effect of the soft iron slugs 19.

It will be seen that the greatest concentrations of flux lines between the magnets and the casing are opposite the two opposed poles of each magnet. Since the material of which the gasket is composed, preferably rubber or soft plastic, is nonmagnetic the flux lines F are arrayed substantially the same as though an air gap existed between the magnets and the casing.

The flux lines F represent attractive forces between the portions of magnetically attractable materials beween which they pass. Accordingly, the flux lines F indicate an attraction between the magnets 18 and the casing 14. Each individual magnet is, therefore, attracted toward the casing 14 and presses the contiguous portion of the gasket firmly against the casing.

The effective air gap between the magnets and the casing constitutes a high reluctance path and accordingly, the flux lines seek other parallel paths between the magnets and the casing. Stated differently, the flux lines tend to repel each other with the result that they seek divergent paths between the magnets and the low reluctance path afforded by the casing. Flux lines F' therefore tend to pass from both poles of each magnet longitudinally outward from the pole and then across the air gap to the casing 14.

The presence of the soft iron slugs 19 greatly increases the proportion of flux lines which actually follow such a path. In other words, the presence of the soft iron slugs greatly increases the number of flux lines F' which pass longitudinally out of the end faces of the magnets and curve across the air gap to the casing 14. This is a desirable characteristic of the metal slugs 19 since it tends to increase the total number of flux lines linking the magnets and the casing but does not constitute the primary purpose thereof.

If the soft iron slugs were to be replaced by nonmagnetic materials a substantial number of flux lines F' would still pass longitudinally outward of the end faces of the magnets and across the air gap to the casing 14 but such flux lines would have no effect whatsoever on the material interposed between the magnets and would serve only to attract the magnets toward the casing. Accordingly, nonmagnetic spacers, for example wooden dowel rods, would not be attracted toward the casing and the portion of the gasket lying between such elements and the casing would not be pressed directly against the casing. With the soft iron slugs 19 arranged between the magnets, the flux lines F' passing therethrough tend to attract the soft iron slugs toward the casing 14 and compress the contiguous portions of the gasket therebetween.

The soft iron slugs 19 therefore provide means for urging against the casing 14 those portions of the gasket which lie intermediate the magnets, and at the same time this effect is greatly enhanced by the fact that the soft iron slugs attract a much larger percentage of the total flux to pass therethrough than would be the case if the space occupied by the slugs were filled with nonmagnetic material.

According to the invention the magnets are so oriented that the opposed ends of each of the soft iron slugs face like poles of adjoining magnets. This is illustrated in Fig. 3 wherein the opposite ends of the soft iron slug 19 shown in the middle of that figure face south poles of the two adjoining magnets 18. The soft iron slugs are much more effective with this arrangement than with opposite poles of adjacent magnets facing any one soft iron slug 19 since in such case, and as may readily be illustrated by experiment, a relatively small number of flux lines F' will pass between the soft iron slugs and the casing with the result that there is relatively little force therebetween and relatively little compression of the gasket therebetween.

It is well-known that high quality permanent magnets are quite expensive, particularly as compared to a piece of soft iron of equal size. As opposed to an arrangement wherein a plurality of permanent magnets are arranged in abutting relationship, a magnetic door seal constructed in accordance with the invention may employ approximately one-half the total number of permanent magnets while at the same time a seal is effected over the entire length of the apparatus and with a substantial force.

In the embodiment of the invention disclosed, the magnets and alternate soft iron slugs have been shown as contained within the gasket and magnetically attractable to the casing 14. It is within the scope of the invention, however, that the magnets be arranged on the casing to attract magnetically attractable material arranged within the gasket. In either case, the suggested soft iron slugs may be any magnetically attractable material. Where the magnets are arranged on the casing, the magnetically attractable material interposed between magnets would preferably include a fairly broad flat surface for abutting the gasket. Also the magnetically attractable material arranged within the gasket should, of course, be longitudinally flexible and might for example be short lengths of iron rod or powdered magnetically attractable metal. It will be apparent also that the gasket may be mounted on the casing and cooperate with a sealing surface on the door.

The use of nonmagnetic spacing elements as above referred to has already been disclosed in co-pending application Serial No. 295,608 referred to above.

It will be apparent that the invention may be varied in its physical embodiment without departing from the spirit of the invention, and it is desired, therefore, that the invention be limited only by the prior art and the scope of the appended claims.

While a particular embodiment has been shown, it will be understood, of course, that the invention is not limited thereto, since many modifications may be made and it is therefore contemplated to cover by the appended claims any such modifications as fall within the true spirit and scope of the invention.

The invention having thus been described, what is claimed and desired to be secured by Letters Patent is:

1. The combination comprising, a gasket adapted to effect a seal beween a door member and a casing member along a line extending around an opening closable by said door, said gasket having a longitudinally extending portion attached to one of said members, magnetically attractable means arranged to abut another longitudinally extending portion of said gasket to effect said seal when said door is closed, and longitudinally flexible magnetically attractable means arranged within said gasket adjacent said other longitudinally extending portion thereof, one of said means comprising a substantially continuous formation of nonmagnetized but magnetically attractable material, the other of said means comprising a plurality of permanent magnets spaced apart longitudinally with respect to said line of seal and a plurality of nonmagnetized but magnetically attractable elements arranged between and substantially in contact with said magnets, each of said magnets being arranged with its poles spaced longitudinally of said line of seal, and said magnets being so oriented that the opposed ends of each of said elements face like poles of adjoining magnets.

2. The combination comprising, a gasket adapted to effect a seal between a door member and a casing member along a line extending around an opening closable by said door, said gasket having a longitudinally extending portion attached to said door member, magnetically attractable means arranged to abut another longitudinally extending portion of said gasket to effect said seal when said door is closed, and longitudinally flexible magnetically attractable means arranged within said gasket adjacent said other longitudinally extending portion thereof, one of said means comprising a substantially continuous formation of nonmagnetized but magnetically attractable material, the other of said means comprising a plurality of permanent magnets spaced apart longitudinally with respect to said line of seal and a plurality of nonmagnetized but magnetically attractable elements arranged between and substantially in contact with said magnets, each of said magnets being arranged with its poles spaced longitudinally of said line of seal, and said magnets being so oriented that the opposed ends of each of said elements face like poles of adjoining magnets.

3. The combination comprising, a gasket adapted to effect a seal between a door member and a casing member along a line extending around an opening closable by said door, said gasket having a longitudinally extending portion attached to one of said members, means arranged to abut another longitudinally extending portion of said gasket to effect said seal when said door is closed, said means comprising a substantially continuous formation of nonmagnetized but magnetically attractable material, and magnetic means arranged within said gasket adjacent said other longitudinally extending portion thereof for attracting said first-mentioned means, said magnetic means comprising a plurality of permanent magnets spaced apart longitudinally with respect to said gasket and a plurality of nonmagnetized but magnetically attractable elements arranged between and substantially in contact with said magnets, each of said magnets being arranged with its poles spaced longitudinally of said gasket, and said magnets being so oriented that the opposed ends of each of said elements face like poles of adjoining magnets.

4. The combination comprising, a gasket adapted to effect a seal between a door member and a casing member along a line extending around an opening closable by said door, said gasket having a longitudinally extending portion attached to said door member, magnetically attractable means arranged to abut another longitudinally extending portion of said gasket to effect said seal when said door is closed, said means comprising a substantially continuous formation of nonmagnetized but magnetically attractable material, and magnetic means arranged within said gasket adjacent said other longitudinally extending portion thereof for attracting said first-mentioned means, said magnetic means comprising a plurality of permanent magnets spaced apart longitudinally with respect to said gasket and a plurality of nonmagnetized but magnetically attractable elements arranged between and substantially in contact with said magnets, each of said magnets being arranged with its poles spaced longitudinally of said gasket, and said magnets being so oriented that the opposed ends of each of said elements face like poles of adjoining magnets.

5. The combination comprising, a gasket adapted to effect a seal between a door member and a casing member along a line extending around an opening closable by said door, said gasket having a longitudinally extending portion attached to said door member, magnetically attractable means forming a part of said casing member and arranged to abut a tubular longitudinally extending portion of said gasket to effect said seal when said door is closed, and magnetic means arranged within said tubular portion of said gasket, said magnetic means comprising a plurality of permanent magnets spaced apart longitudinally with respect to said gasket and a plurality of nonmagnetized but magnetically attractable elements arranged between and substantially in contact with said magnets, each of said magnets being arranged with its poles spaced longitudinally of said gasket, and said magnets being so oriented that the opposed ends of each of said elements face like poles of adjoining magnets.

ANTON W. KORB.

References Cited in the file of this patent

UNITED STATES PATENTS

| Number | Name | Date |
| --- | --- | --- |
| 2,446,336 | Mark et al. | Aug. 3, 1948 |
| 2,471,634 | Mark et al. | May 31, 1949 |
| 2,471,635 | Mark et al. | May 31, 1949 |
| 2,565,891 | Sherman | Aug. 28, 1951 |